(12) United States Patent
Bai et al.

(10) Patent No.: US 12,333,431 B2
(45) Date of Patent: Jun. 17, 2025

(54) MULTI-DIMENSIONAL GENERATIVE FRAMEWORK FOR VIDEO GENERATION

(71) Applicant: Lemon Inc., Grand Cayman (KY)

(72) Inventors: Song Bai, Singapore (SG); Zhongcong Xu, Singapore (SG); Jiashi Feng, Singapore (SG); Jun Hao Liew, Singapore (SG); Wenqing Zhang, Singapore (SG)

(73) Assignee: Lemon Inc., Grand Cayman (KY)

( * ) Notice: Subject to any disclaimer, the term of this patent is extended or adjusted under 35 U.S.C. 154(b) by 361 days.

(21) Appl. No.: 18/063,843

(22) Filed: Dec. 9, 2022

(65) Prior Publication Data

US 2024/0193412 A1 Jun. 13, 2024

(51) Int. Cl.
*G06K 9/00* (2022.01)
*G06N 3/08* (2023.01)

(52) U.S. Cl.
CPC ...... *G06N 3/08* (2013.01); *G06T 2207/20081* (2013.01)

(58) Field of Classification Search
CPC .......... G06N 3/08; G06N 3/047; G06N 3/088; G06T 2207/20081; H04N 19/188;
(Continued)

(56) References Cited

U.S. PATENT DOCUMENTS

| 11,727,596 | B1 * | 8/2023 | Gafni | G06T 7/20 382/291 |
| 2021/0350346 | A1 * | 11/2021 | Edwards | G06Q 20/1085 |
| 2021/0375062 | A1 * | 12/2021 | Fleischman | G06F 18/24 |

FOREIGN PATENT DOCUMENTS

WO WO-2020077198 A1 * 4/2020

OTHER PUBLICATIONS

Bahmani et al.,"3D-Aware Video Generation", Computer Science, Computer Vision and Pattern Recognition, accessed online from: https://arxiv.org/abs/2206.14797; submitted Jun. 29, 2022, last revised Oct. 17, 2022.

(Continued)

*Primary Examiner* — Xin Jia
(74) *Attorney, Agent, or Firm* — Fish & Richardson P.C.

(57) ABSTRACT

Generating a multi-dimensional video using a multi-dimensional video generative model for, including, but not limited to, at least one of static portrait animation, video reconstruction, or motion editing. The method including providing data into the multi-dimensionally aware generator of the multi-dimensional video generative model, and generating the multi-dimensional video from the data by the multi-dimensionally aware generator. The generating of the multi-dimensional video includes inverting the data into a latent space of the multi-dimensionally aware generator, synthesizing content of the multi-dimensional video using an appearance component of the multi-dimensionally aware generator and corresponding camera pose and formulating an intermediate appearance code, developing a synthesis layer for encoding a motion component of the multi-dimensionally aware generator at a plurality of timesteps and formulating an intermediate motion code, introducing temporal dynamics into the intermediate appearance code and the intermediate motion code, and generating multi-dimensionally aware spatio-temporal representations of the data.

20 Claims, 7 Drawing Sheets

(58) Field of Classification Search
CPC .... H04N 19/172; H04N 19/187; H04N 19/33; H04N 19/53; H04N 19/59
See application file for complete search history.

(56) References Cited

OTHER PUBLICATIONS

Chan et al.,"Efficient Geometry-aware 3D Generative Adversarial Networks", Computer Science, Computer Vision and Pattern Recognition, accessed online from: https://arxiv.org/abs/2112.07945; submitted Dec. 15, 2021, last revised Apr. 27, 2022.
Deng et al., "GRAM: Generative Radiance Manifolds for 3D-Aware Image Generation", Computer Science, Computer Vision and Pattern Recognition, accessed online from: https://arxiv.org/abs/2112.08867; submitted Dec. 16, 2021, last revised Aug. 23, 2022.
Goodfellow et al., "Generative Adversarial Nets", Computer Science, Computer Vision and Pattern Recognition, accessed online from: https://arxiv.org/abs/1406.2661; submitted Jun. 10, 2014, published Dec. 8, 2014.
Gu et al., "StyleNeRF: A Style-based 3D-Aware Generator for High-resolution Image Synthesis", Computer Science, Computer Vision and Pattern Recognition, accessed online from: https://arxiv.org/abs/2110.08985; submitted Oct. 18, 2021.
Karras et al., "Analyzing and Improving the Image Quality of StyleGAN", Computer Science, Computer Vision and Pattern Recognition, accessed online from: https://arxiv.org/abs/1912.04958; Submitted Dec. 3, 2019, last revised Mar. 23, 2020.
Karras et al., "A Style-Based Generator Architecture for Generative Adversarial Networks", accessed online from: https://arxiv.org/abs/1812.04948; submitted Dec. 12, 2018,last revised Mar. 29, 2019.
N. Max et al., "Optical models for direct vol. rendering", IEEE Transactions on Visualization and Computer Graphics, vol. 1, Issue: 2, Jun. 1995.
Mescheder et al., "Which Training Methods for GANs do actually Converge?", Computer Science, Machine Learning, accessed online from: https://arxiv.org/abs/1801.04406#:~:text=Our%20analysis%20shows%20that%20GAN%20training%20with%20instance,do%20not%20always%20converge%20to%20the%20equilibrium%20point.; submitted Jan. 13, 2018, last revised Jul. 31, 2018.
Mildenhall et al., "NeRF: Representing Scenes as Neural Radiance Fields for View Synthesis", Computer Science, Machine Learning, accessed online from: https://arxiv.org/abs/2003.08934; submitted Mar. 19, 2020, last revised Aug. 3, 2020.
Or-El et al., "StyleSDF: High-Resolution 3D-Consistent cImage and Geometry Generation", Computer Science, Machine Learning, accessed online from: https://arxiv.org/abs/2112.11427; submitted Dec. 21, 2021, last revised Mar. 30, 2022.
Richardson et al., "Encoding in Style: a StyleGAN Encoder for Image-to-Image Translation", Computer Science, Machine Learning, accessed online from: https://arxiv.org/abs/2008.00951; submitted Aug. 3, 2020, last revised Apr. 21, 2021.
Shen et al., "Interpreting the Latent Space of GANs for Semantic Face Editing", Computer Science, Machine Learning, accessed online from: https://arxiv.org/abs/1907.10786; submitted Jul. 25, 2019, last revised Mar. 31, 2020.
Tian et al., "A Good Image Generator Is What You Need for High-Resolution Video Synthesis", Computer Science, Machine Learning, accessed online from: https://arxiv.org/abs/2104.15069; submitted Apr. 30, 2021.
Tov et al., "Designing an Encoder for StyleGAN Image Manipulation", Computer Science, Machine Learning, accessed online from: https://arxiv.org/abs/2102.02766; submitted Feb. 4, 2021.
Zhang et al., "Multi-View Consistent Generative Adversarial Networks for 3D-aware Image Synthesis", Computer Science, Machine Learning, accessed online from: https://arxiv.org/abs/2204.06307; submitted Apr. 13, 2022.

* cited by examiner

MULTI-DIMENSIONAL GENERATIVE FRAMEWORK FOR VIDEO GENERATION

FIELD

The embodiments described herein pertain generally to neural networks. More specifically, the embodiments described herein pertain to generating multi-dimensional video from a pre-trained multi-dimensionally aware generative model or framework.

BACKGROUND

Generative adversarial networks (GANs) are deep learning-based generative models that can be used for generating images and performing image manipulation which can be used for a number of different industrial applications. However, such prior models and GANs have not been successfully used for generating three-dimensional (3D) videos, e.g., for 3D portrait video generation and video manipulation and animation. Rather, such prior models can produce two-dimensional (2D) video which does not consider the underlying 3D geometry, which is a desirable attribute for use for portrait reenactment, talking face animation, and virtual reality/augmented reality (VR/AR). While methods and models exist for generating 3D portrait video, such methods and models use classical graphics techniques, which require multi-camera systems, well-controlled studios, heavy artist works, and large amounts of training data.

SUMMARY

In one example embodiment, a method for generating a multi-dimensional video is provided. The method includes providing an input data to a multi-dimensionally aware generator of a multi-dimensionally aware generative model and generating the multi-dimensional video from the input data by the multi-dimensionally aware generator. The generating may include inverting the input data into a latent space of the multi-dimensionally aware generator; synthesizing content of the multi-dimensional video using an appearance component of the multi-dimensionally aware generator and corresponding camera pose and formulating an intermediate appearance code, developing a synthesis layer for encoding a motion component of the multi-dimensionally aware generator at a plurality of timesteps and formulating an intermediate motion code, introducing temporal dynamics into the intermediate appearance code and the intermediate motion code, and generating multi-dimensionally aware spatio-temporal representations of the input data.

In accordance with at least one other example embodiment, a method for static portrait animation is provided. The method includes providing a static portrait to a multi-dimensionally aware generator of a multi-dimensionally aware generative model and generating animation of the static portrait by the multi-dimensionally aware generator. The generating may include inverting the static portrait into a latent space of the multi-dimensionally aware generator and synthesizing content of the multi-dimensional video using an appearance component of the multi-dimensionally aware generator and corresponding camera pose and formulating an intermediate appearance code. The synthesizing may include initially fixing the multi-dimensionally aware generator to optimize the appearance code at an initial time step of 0. The method further includes developing a synthesis layer for encoding a motion component of the multi-dimensionally aware generator at a plurality of timesteps and formulating an intermediate motion code, in which developing the synthesis layer includes fixing the appearance component and randomly sampling the motion component, introducing temporal dynamics into the intermediate appearance code and the intermediate motion code, and generating multi-dimensionally aware spatio-temporal representations of the static portrait.

In accordance with at least one other example embodiment, a method for video reconstruction and/or motion editing is provided. The method includes providing a monocular video to a multi-dimensionally aware generator of a multi-dimensionally aware generative model and reconstructing the video and/or editing motion in the monocular video by the multi-dimensionally aware generator. The generating may include inverting the monocular video into a latent space of the multi-dimensionally aware generator and synthesizing content of the multi-dimensional video using an appearance component of the multi-dimensionally aware generator and corresponding camera pose and formulating an intermediate appearance code. The synthesizing may include initially fixing the multi-dimensionally aware generator to optimize the appearance component in the latent space. The method further includes developing a synthesis layer for encoding a motion component of the multi-dimensionally aware generator at a plurality of timesteps and formulating an intermediate motion code, in which developing the synthesis layer comprises inversing the motion component for each frame in the video individually and sampling a plurality of motion components to provide motion multi-dimensionally, introducing temporal dynamics into the intermediate appearance code and the intermediate motion code, and generating multi-dimensionally aware spatio-temporal representations of the static portrait. As such, a multi-dimensional generative model or framework may be provided that may be used to generate a large variety of multi-dimensionally-aware, e.g., three-dimensional or four-dimensional, videos with high-quality appearance, motions, and geometry. The generative model or framework may be based on using multi-planar, e.g., tri-plane or three-planar, representations to include temporal components or dynamics to generate multi-dimensionally aware spatio-temporal representations. The generative model or framework may also be conditioned and trained from 2D monocular videos only, without the need of any 3D or multi-view annotations.

The multi-dimensional generative model or framework disclosed herein may, thus, support several downstream applications, including, but not limited to, static image animation, monocular video reconstruction, multi-view consistent motion editing, and/or VR/AR simulation.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
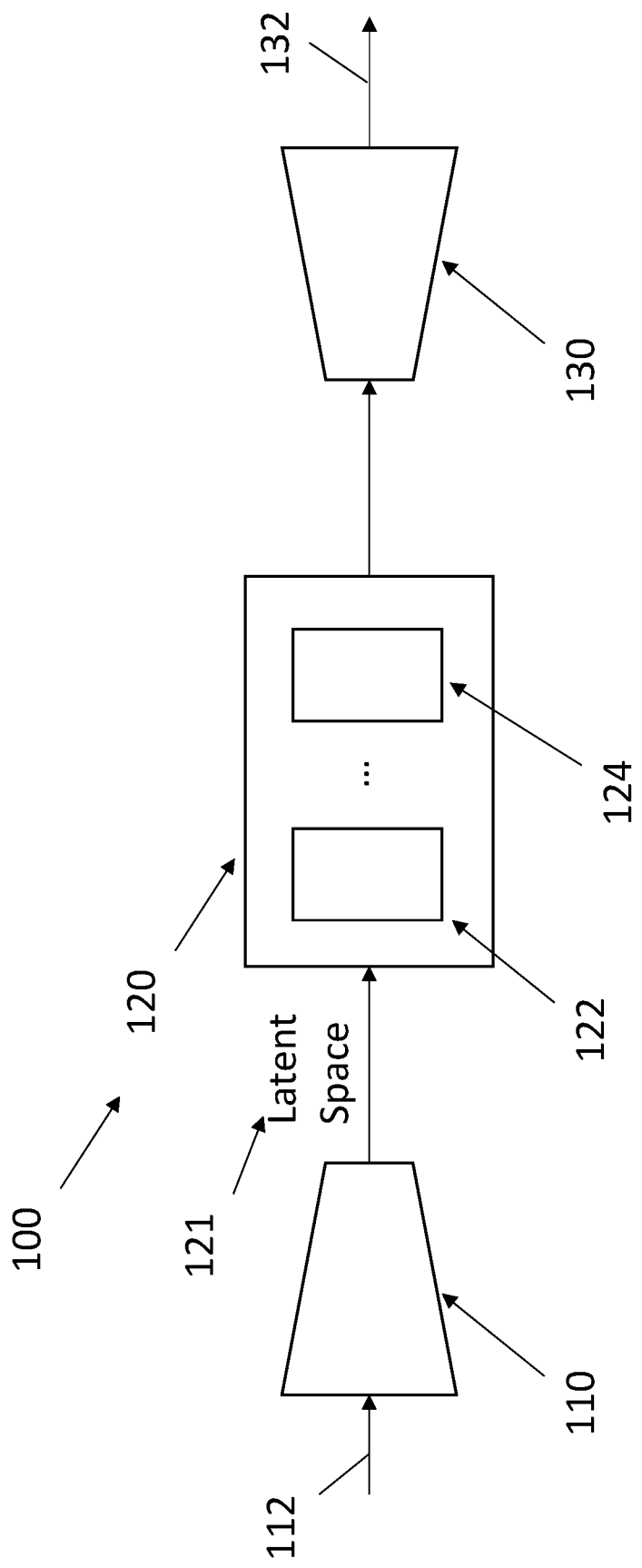
FIG. 1 illustrates an example framework or model for generating multi-dimensional video a multi-dimensionally aware image generator may be implemented, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "multi-dimensionally aware generator" may refer to a deep machine learning-based framework or model that may be used to generate multi-dimensionally implicit neural representations that are modeled in a spatio-temporal space. The multi-dimensionally aware generator may be configured to learn real data distribution to generate data closer to the distribution to fool a discriminator, e.g., by not minimizing distance via unsupervised learning, and a discriminator neural network that is configured to discriminate between the real and generated images, e.g., contest each other as a zero-sum game. It is to be understood that in the field of machine learning, training a multi-dimensionally aware generative model or framework typically requires a dataset. It is further to be understood that "pre-trained" may indicate that a machine learning model has been trained and the corresponding training checkpoint has been used and the model is ready for deployment and deployed.

As referenced herein, a model or framework may refer to software, i.e., algorithms and/or programs, hardware or firmware, or any combination thereof that supports machine learning, natural language understanding, natural language processing, speech recognition, computer vision, etc.

As referenced herein, "latent features," in accordance with computer vision and image processing, may refer to feature vectors extracted from an image, e.g., a 2D portrait image or monocular video. The feature vectors may be extracted by an encoder of a generative model, i.e., features that are extracted from an input dataset that correspond to any one of the input captions, e.g., classifications, or by the generative model itself.

As referenced herein, "latent space" may refer to a latent feature space or embedding space in which items resembling each other more closely are positioned close to one another. In a non-limiting example, the latent space may be a W+ latent space which may be a concatenation of 18 different 512 dimensional w vectors.

As referenced herein, "multi-dimensional" or "multi-dimensionally" or "multi-plane" or "multi-planar" may refer a system that include multiple planes, such as, in non-limiting example, three-dimensional planes, quad-dimensional plane, or greater or higher-dimensional planar frameworks or sight-distance fields. Such features may refer to three-dimensional planes that include additional features, including, but not limited to, temporal components. Additionally, such features may refer to a system that visually provided to a user or in a virtual or augmented or alternate reality experience or setting.

FIG. 1 illustrates an example multi-dimensional video generative model or framework 100 that may be implemented for generating a multi-dimensional video, arranged in accordance with at least some embodiments described herein. As depicted, the multi-dimensional video generative model or framework 100 may include an encoder 110, a generative model 120, and a decoder 130. The multi-dimensional video generative model or framework 100 may be implemented by a program, custom circuits, or by a combination thereof. In an embodiment, the multi-dimensional video generative model or framework 100 may be implemented using a graphics processing unit ("GPU"), central processing unit ("CPU"), or other processor-enabled device, which may be cloud-based, a local device, or downloaded to the local device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

The encoder 110 may refer to one or more components or modules that are designed, programmed, or otherwise configured to receive input data 112 that may include an image or video, for example, a monocular 2D portrait image or 2D video. In a non-limiting example, the encoder 110 may be designed, programmed, or otherwise trained to iteratively extract, from the input data 112, feature vectors corresponding to latent features into a latent space 121, in accordance with known encoding technologies, i.e., extracted or mapped into the latent space 121. Non-limiting examples of extracted features may include surfaces, gender, skin color, lighting, coloring, identities, motion, animals, objects, edges, points, boundaries, curves, shapes, etc. A non-limiting example may include using marching cubes to extract surfaces from the input data.

Input data 112 may refer to data provided by one or more embodiments of e.g., a database, a cloud, and/or a classical computing device that may be, or include, a classical computer, processing device, a microprocessor, a microcontroller, a digital signal processor, or any combination thereof. Data from input data 112 may be from one of various electronic devices, or a combination thereof, having one or more image and/or video capturing components, i.e., camera and/or video recorder, display screens with audio and/or video inputs/outputs and that support the providing of and consumption of content relative to a media platform. The various electronic devices may include but not be limited to a smartphone, a tablet computer, a laptop computer, a desktop computer, a security/surveillance device, an e-book reader, an MP3 (moving picture experts group audio layer III) player, an MP4 player, and/or any other suitable electronic devices that may be used to upload or send the input data to the multi-dimensional video generative model or framework 100.

The generative model 120 may include a generator neural network 122 (referred to herein as "generator" or "multi-dimensionally aware generator") and a discriminator neural network 124 (referred to herein as "discriminator") for generating the multi-dimensional video. The generator 122 and/or the discriminator 124 may include functions, operations, actions, algorithms, an application, or the like. The generative model 120, the generator 122, and/or discriminator 124 may be hosted, implemented, executed, and/or stored in a device (e.g., 700 of FIG. 7, etc.).

The generator 122 is configured to receive the feature vectors and/or the latent features of the input data 112 from the latent space 121 and generate multi-dimensionally aware spatio-temporal representations, e.g., a multi-dimensionally aware generator. The generator 122 may be conditioned on learned latent codes, timesteps, and camera poses, e.g., using learned constants of the generator 122, to add temporal features or dynamics to multi-dimensional implicit neural representations to model the spatio-temporal space to generate the multi-dimensionally aware spatio-temporal representations. In an embodiment, the generator 122 may formulate generating the multi-dimensionally aware spatio-temporal representations as:

$$v = \mathcal{R}(\mathcal{G}(z|c,t),c)$$

In this embodiment, the generator 122, e.g. $\mathcal{G}(\cdot)$, first generates multi-dimensionally-aware spatio-temporal representations, which may then be followed by volume rendering $\mathcal{R}(\cdot)$ to obtain the final video sequence for the multi-dimensional video, e.g., three-dimensional video. In an embodiment, instead of jointly modeling appearance and motion dynamics within a single latent code z, the multi-dimensionally-aware spatio-temporal representations are factorized into appearance and motion generation components. For example, in an embodiment, the generator 122 may take an appearance latent code, $z_a \sim N(0, 1)$, and a motion latent code $z_m \sim N(0, 1)$, as inputs into the neural network. The generator 122 may then be conditioned such that $z_a$ is used to synthesize varying video appearances, e.g., genders, skin colors, identities, etc., and $z_m$ is used to model motion dynamics, e.g., a person opening his/her mouth or turning his/her head. As such, the generator 122 may be configured to introduce motion dynamics by stacking multiple motion layers to generate the motion features via modulated convolution.

The discriminator 124 may include an image discriminator and a video discriminator to further guide the multi-dimensional video generation process, e.g., regularize the spatial and temporal domains of the generated multi-dimensionally-aware spatio-temporal representations. The discriminator 124 may be configured to ensure plausibility of the video generation by being coded to improve the video appearance quality and to ensure video motion plausibility by using camera poses as conditions to guide the generator 122. As such, the discriminator 124 may be configured to modify the generated multi-dimensionally aware spatio-temporal representations from the generator 122.

Decoder 130 may refer to a pre-trained model that is designed, programmed, or otherwise trained to generate the multi-dimensional video from the modified multi-dimensionally aware spatio-temporal representations from the discriminator 124. Decoder 130 may be configured to combine the resulting multi-dimensional video from the video discriminator and the appearances from the image discriminator and optimize the latent features of input data 112 based on conditioned components of the multi-dimensional video generative model. Decoder 130 may also be configured to volume render the generated multi-dimensional video to obtain the final video sequence for the multi-dimensional video. While a decoder 130 has been described as a separate element or feature, it is understood that the decoding function may also be integrated or provided in the generative model 120 or multi-dimensionally aware generator.

Figure 2:
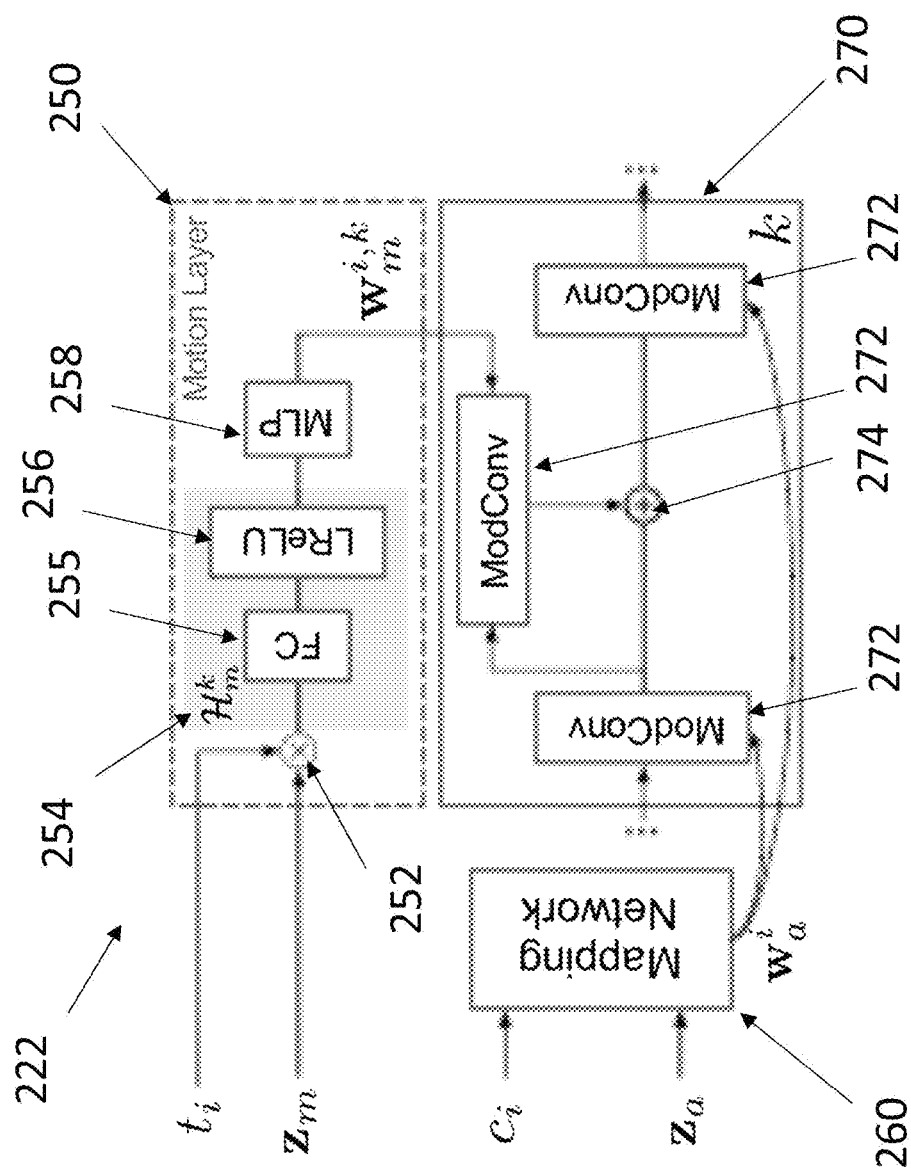
FIG. 2 illustrates an example multi-dimensionally aware generator, arranged in accordance with at least some embodiments described herein.

FIG. 2 illustrates an example embodiment of a generator neural network 222, referred to herein as "generator," that may be used in a multi-dimensional video generative model or framework (e.g., 100) for generating a multi-dimensional video, arranged in accordance with at least some embodiments described herein. The generator 222 may include a motion layer 250, a mapping network 260, and a synthesis network 270. In an embodiment, the generator 222 may be conditioned on the latent codes $z_a$ and $z_m$, timesteps $\{t_i, t_j\}$, and camera poses $\{c_i, c_j\}$ to generate motion at each timestep in the multi-dimensional video. In an example embodiment, at a timestep $t_i$, K motion layers may be used in a synthesis layer of the generator 222, in which each motion layer encodes the motion code $z_m$ and timestep $t_i$ into an intermediate motion code $w_m^{i,k}$.

In an example embodiment, the motion layer 250 may include a multiplying function 252, a light weight mapping layer 254, and a fully connected artificial neural network 258 to generate motion features via modulated convolutions. The motion layer 250 may be configured to initially use the multiplying function 252 to multiply the motion code $z_m$ with timestep $t_i$ to encode temporal information to the input data.

The motion layer 250 may be further configured to perform a lightweight mapping of the resulting multiplication in the lightweight mapping layer 254, e.g., using a lightweight mapping head $H_m$. The lightweight mapping layer 254 may include a fully connected (FC) layer 255 and an activation function 256, e.g., a leaky rectified linear unit (ReLU) activation. The FC layer 255 may include weights and biases and be configured to connect neurons between different layers, e.g., between the different motion layers. The activation function 256 may be configured to transform the summed weighted input from the node into an output for that node. In an embodiment, when the activation function 256 is a ReLU, the activation function 256 may be configured as a piecewise linear function to output the input directly if positive, otherwise, output zero.

The fully connected artificial neural network 258 may be, for example, a multi-layer perceptron (MLP) having at least an input layer, hidden layer, and output layer, and may be configured to encode the output from the light weight mapping layer 254 into $w_m^{i,k}$. In other words, the k-th motion layer may be computed as:

$$w_m^{i,k} = MLP_k(H_m^k(z_m * t_i)),$$

where $k \in \{0, 1 \ldots, K\}$, $i \in \{0, 1, \ldots, \mathcal{N}\}$ denotes the frame index while N represents the number of frames in one video.

The mapping network 260 may be configured to take or project camera pose, e.g., $c_i$, for each frame and the appearance code $z_a$ into the input data, e.g., 2D portrait or 2D video, to generate intermediate appearance code $w_a^i$. In an embodiment, the camera pose $c_i$ and the appearance code $z_a$ may be mapped to the input data in the latent space (e.g., 121) in which the appearance code $z_a$ and camera pose $c_i$ may be applied for each feature layer of the input data to generate the intermediate appearance code $w_a^i$.

The generator 222 may be further configured to pass the intermediate motion codes $w_m^{i,k}$ to the synthesis network 270 to add temporal dynamics and components. The synthesis network 270 may include a plurality of synthesis layers that may include a plurality of modulation/convolution ("ModConv") layers 272 and an addition function 274. The ModConv layer 272 may include at least one of a modulation, convolution, or normalization layer to generate style-transferred images. As such, in an embodiment, the generator 222 may use the intermediate motion codes $w_m^{i,k}$ in the synthesis network 270 to modulate the static appearance features of the input data (e.g., 112) to incorporate the temporal dynamics and components, e.g., at the timesteps. In an example embodiment, an adaptive instance normalization, such as AdaIN, may be used to align the mean and variance of the motion features with those of the appearance features, e.g., using the addition function 274. In another example embodiment, the generator 222 may include an equivalent operator, e.g., modulated convolution network, to compute the motion features through a plurality of layers that are based on binarized convolutional filters and modulation filters ("M-Filters").

In an example embodiment, after the motion features are computed, the generator 222 may be configured to fuse the motion features controlled by $w_m^{i,k}$ with the appearance features controlled by $w_a^i$ in different synthesis layers of the synthesis network 270. The synthesis network 270 may be configured to pass the fused features to a next layer, e.g., next synthesis layer, iteratively to generate features in a hybrid explicit-implicit multi-dimensional representation, for example, via the following process:

$$f_k = S_k^1(f^* + \text{ModConv}(f^*, w_m^{i,k}), w_a^i), \text{ where } f^* = S_k^0(f_{k-1}, w_a^i).$$

Here, $S_k^0$ and $S_k^1$ denote the first and second synthesis layers or blocks, e.g., ModConv layers 272, in the k-th synthesis layer, while $f_k$ denotes the feature map synthesized by the k-th layer. That is, the features in the hybrid explicit-implicit multi-dimensional representation may be generated, in a non-limiting example, in a temporal three-planar network, for example, a four-dimensional network or representation, by modulating the appearance features controlled by $w_a^i$ with the motion features controlled by $w_m^{i,k}$ and timestep. In an embodiment, the hybrid explicit-implicit multi-dimensional representation may be a three-dimensional Plane, tri-planar, quad-planar, or greater planar framework or sight-distance field, for example, as may be further used in GAN networks, e.g., three planes with a resolution of N×N×C, in which a three-dimensional position is projected into the planes, and the corresponding feature vectors are summed and passed to a decoder and include temporal components.

In an embodiment, to preserve the identity in the generated videos, the generator 222 may be configured such that a predetermined amount of K synthesis layers is used, for example, such that k≤K, for incorporating the motion features. It is understood that the generator 222 has a predetermined amount of K layers such that the predetermined amount increases temporal consistency and improves the generator's capacity for modeling diverse motions. Moreover, it is understood the amount of K layers may be determined to alleviate the overfitting of RGB video frames, to further improve the quality of multi-dimensional geometry in the generated video.

In an example embodiment, since the multi-dimensional video generative model or framework may be used to generate the temporal hybrid explicit-implicit multi-dimensional representations by modulating the appearance features based on the motion code and timestep by encoding the motion code and timestep into intermediate motion codes and computer the motion features in, in a non-limiting example, the temporal multi-planar network, the amount of K layers may be predetermined by the following. The latent space may be analyzed to find out how the manipulation of the appearance features would affect the synthesis results. In an example embodiment, when K increases, the image contents gradually change. While manipulating the appearance code in K=2 layers may largely preserve the contents, however, only modulating features in the first 2 layers would potentially harm the capacity for content diversity of the multi-dimensionally-aware generator. Moreover, when K≥6, there exists a sharp change in the image content. Because one important property for portrait video is the temporal coherence, i.e., consistent identity, K may be selected to be 4 in the multi-dimensionally-aware generator to maintain a good temporal consistency as well as motion diversity.

The generator 222 may be further configured to be conditioned on pre-estimated camera pose sequences that may be predefined trajectories, e.g., head movements 90 degrees, 45 degrees, up or down, or the like. That is, the generator 222 may be conditioned on c; at each time instant $t_i$ such that the multi-dimensional video generative model or framework may generate video of rotating the camera instead of deforming the multi-dimensional scene, e.g., modeling the rotation of the camera around a static face instead of rotating the face in front of a static camera in multiple dimensions. Furthermore, since the generator 222 may be configured on pre-estimated camera pose sequences, the generator 222 may be able to encode view-dependent features for each frame to leverage multi-dimensional priors, e.g., three-dimensional priors, under arbitrary viewpoints, e.g., the view dependent features are encoded from the camera poses. Moreover, the generator 222 may be configured to synthesize contiguous frames during inference, in which for each video, frames may be generated at timestep $t_i$, where $i \in \{0, 1 \ldots, N\}$, and N denotes the maximum number of frames. As discussed above, the generator 222 may be configured to take camera pose $c_i$ for each frame to generate the intermediate appearance code $w_a^i$. While, during training, each frame has its camera pose, the generator 222 may share the same $c_i$ for the mapping network during an inference stage. As such, the generator 222 is designed to improve the multi-view consistency including the temporal consistency to generate realistic videos with diverse motions and high-quality multi-dimensional geometry that may be based on the training dataset, e.g., random camera pose sequence to make the motion more natural, or predefined trajectories.

While the multi-dimensional video generative model or framework and generator 222 has been discussed above, it is understood that such disclosure is not intended to be limiting. Rather, such discussion provides the relevant model or framework for the multi-dimensional video generative model for generating multi-dimensional video from input data. For example, the model or framework may include other neural networks for inverting the input data such that the generator may be configured to synthesize the content of the multi-dimensional video using a pre-trained appearance component and a pre-trained motion component to formulate associated intermediate appearance code(s) and intermediate motion code(s) and introduce temporal dynamics into the intermediate appearance code(s) and intermediate motion code(s) to generate multi-dimensionally aware spatio-temporal representations of the input data.

Figure 3:
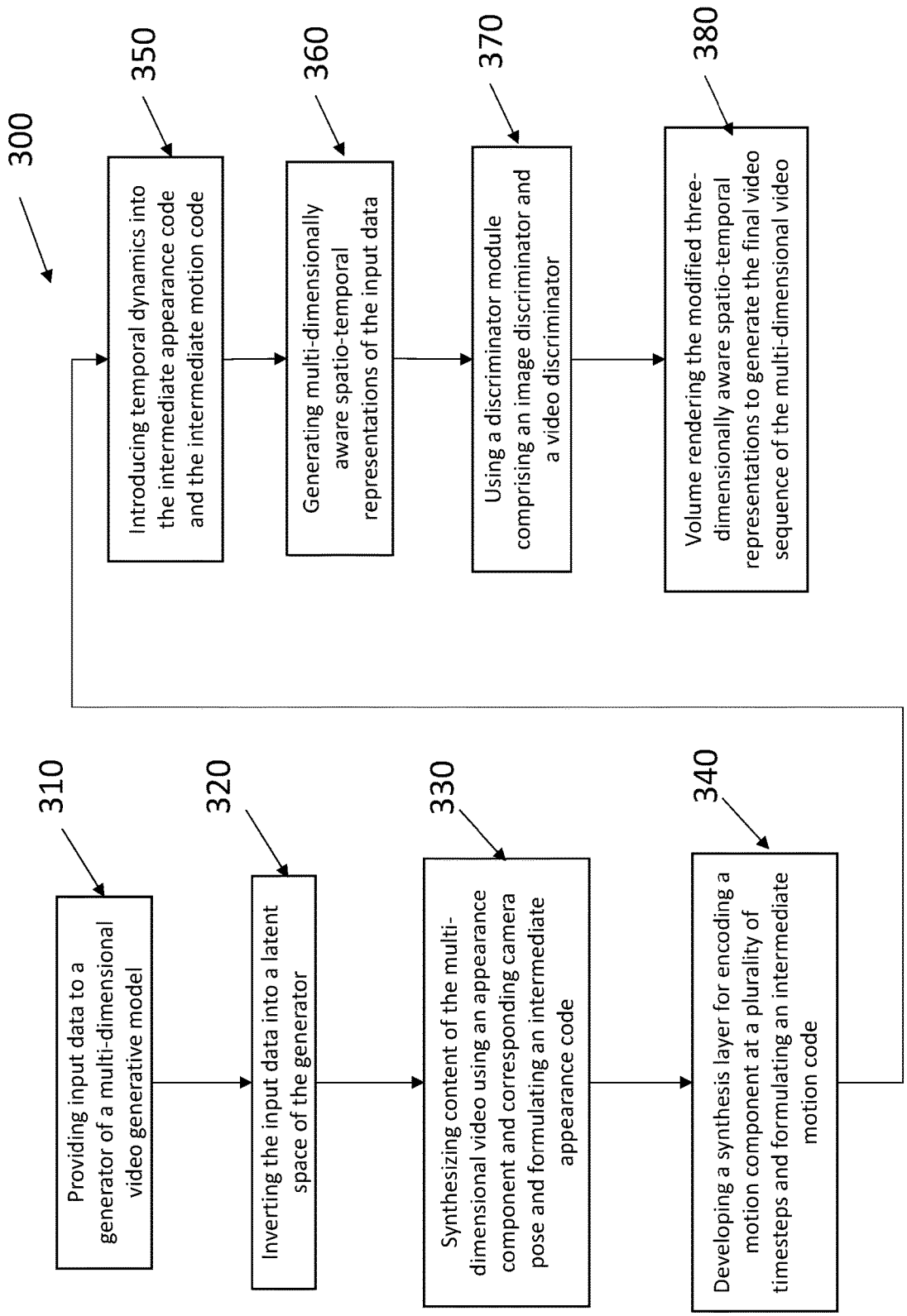
FIG. 3 is a flow chart illustrating an example processing flow of a method for generating multi-dimensional video, in accordance with at least some embodiments described herein.

FIG. 3 illustrates a flowchart of a method 300 for multi-dimensional video generation, in accordance with an example embodiment. The method 300 may be performed by a program, circuitry, or by a combination thereof. For example, the method 300 may be executed by a graphics processing unit, central processing unit, or other processor-enabled device, which may be cloud-based, a local device, or downloaded to the local device. It will be understood by those skilled in the art that each function and/or operation of the components may be implemented, individually and/or collectively, by a wide range of hardware, software, firmware, or any combination thereof.

At 310, the multi-dimensional video generative model or framework may be provided input data for the multi-dimensionally aware generator. The input data (e.g., 112) may refer to data provided by one or more embodiments of e.g., a database, a cloud, and/or a classical computing device that may be, or include, a classical computer, processing device, a microprocessor, a microcontroller, a digital signal processor, or any combination thereof. Data from input data (e.g., 112) may be from one of various electronic devices, or a combination thereof, having one or more image and/or video capturing components, i.e., camera and/or video recorder, display screens with audio and/or video inputs/outputs and that support the providing of and consumption of content relative to a media platform. The various electronic devices may include but not be limited to a smartphone, a tablet computer, a laptop computer, a desktop computer, a security/surveillance device, an e-book reader, an MP3 (moving picture experts group audio layer III) player, an MP4 player, and/or any other suitable electronic devices that may be used to upload or send the input data to the multi-dimensional video generative model or framework (e.g., 100).

The multi-dimensional video generative model may then generate the multi-dimensional video using the multi-dimensionally aware generator as follows:

At 320, the multi-dimensional video generative model or framework may process the input data by inverting the input data into a latent space, e.g., by using an encoder. The input data may be processed by iteratively extracting feature vectors corresponding to latent features in the latent space, for example, using marching cubes to extract surface features from the input data.

At 330, the content of the multi-dimensional video may be synthesized using an appearance component or code $z_a$ of the multi-dimensionally aware generator and corresponding camera pose e.g., $c_i$ to formulate an intermediate appearance code $w_a^i$. The intermediate appearance code may be mapped by taking or projecting camera pose, e.g., $c_i$, for each frame and the appearance code $z_a$ into the input data, e.g., 2D portrait or 2D video, to generate the intermediate appearance code $w_a^i$, e.g., for each feature layer.

At 340, a synthesis layer may be used for encoding a motion component or code $z_m$ of the multi-dimensionally aware generator at a plurality of timesteps e.g., $t_i$ to formulate an intermediate motion code $w_m^{i,k}$. In an example embodiment, the motion features may be generated using modulated convolutions, in which the motion code $z_m$ is multiplied with the timestep $t_i$ to encode temporal information to the input data. A lightweight mapping may then be performed, e.g., using a lightweight mapping head $H_m$. The lightweight mapping may include connecting the neurons in multiple layers using a fully connected (FC) layer and an activation function, e.g., a leaky rectified linear unit (ReLU) activation.

At 350, temporal dynamics may be introduced into the intermediate appearance code e.g., $w_a^i$ and the intermediate motion code $w_m^{i,k}$ to generate multi-dimensionally aware spatio-temporal representations of the input data. In an example embodiment, a synthesis network may be used that includes a plurality of synthesis layers that may include a plurality of modulation/convolution ("ModConv") layers to generate style-transferred images. As such, in an embodiment, the intermediate motion codes $w_m^{i,k}$ may be used in the synthesis network to modulate the static appearance features of the input data (e.g., 112) to incorporate the temporal dynamics and components, e.g., at the timesteps. After the motion features are computed, the step may include fusing the motion features controlled by $w_m^{i,k}$ with the appearance features controlled by $w_a^i$ in different synthesis layers of the synthesis network. The synthesis network may pass the fused features to a next layer, e.g., synthesis layer, iteratively to generate features in a hybrid explicit-implicit multi-dimensional representation, for example, via the following process:

$$f_k = S_k^1(f^* + \text{ModConv}(f^*, w_m^{i,k}), w_a^i), \text{ where } f^* = S_k^0(f_{k-1}, w_a^i).$$

That is, at 360, the features in the hybrid explicit-implicit multi-dimensional representation may be generated in, in a non-limiting example, a temporal multi-planar network by modulating the appearance features controlled by $w_a^i$ with the motion features controlled by $w_m^{i,k}$ and timestep to generate multi-dimensionally aware spatio-temporal representations of the input data (e.g., 112).

At 370, the multi-dimensionally aware spatio-temporal representations may be modified by a discriminator that includes an image discriminator and a video discriminator, e.g., regularize the spatial and temporal domains of the generated multi-dimensionally-aware spatio-temporal representations. Discrimination may occur to ensure plausibility of the video generation by being coded to improve the video appearance quality and to ensure video motion plausibility by using camera poses as conditions to guide the generation of the multi-dimensionally-aware spatio-temporal representations.

At 380, the modified multi-dimensionally aware spatio-temporal representations may be volume rendered to generate the final video sequence of the multi-dimensional video, e.g., three-dimensional video. The volume rendering may be performed by a decoder that may be a pre-trained diffusion model that is configured to combine the resulting multi-dimensional video from the video discriminator and the appearances from the image discriminator and optimize the latent features of input data (e.g., 122) based on conditioned components of the multi-dimensional video generative model or framework.

It is also to be understood that the processing flow 300 may include one or more operations, actions, or functions as illustrated by one or more of blocks 310, 320, 330, 340, 350, 360, 360, 370, and 380. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation.

Figure 4:
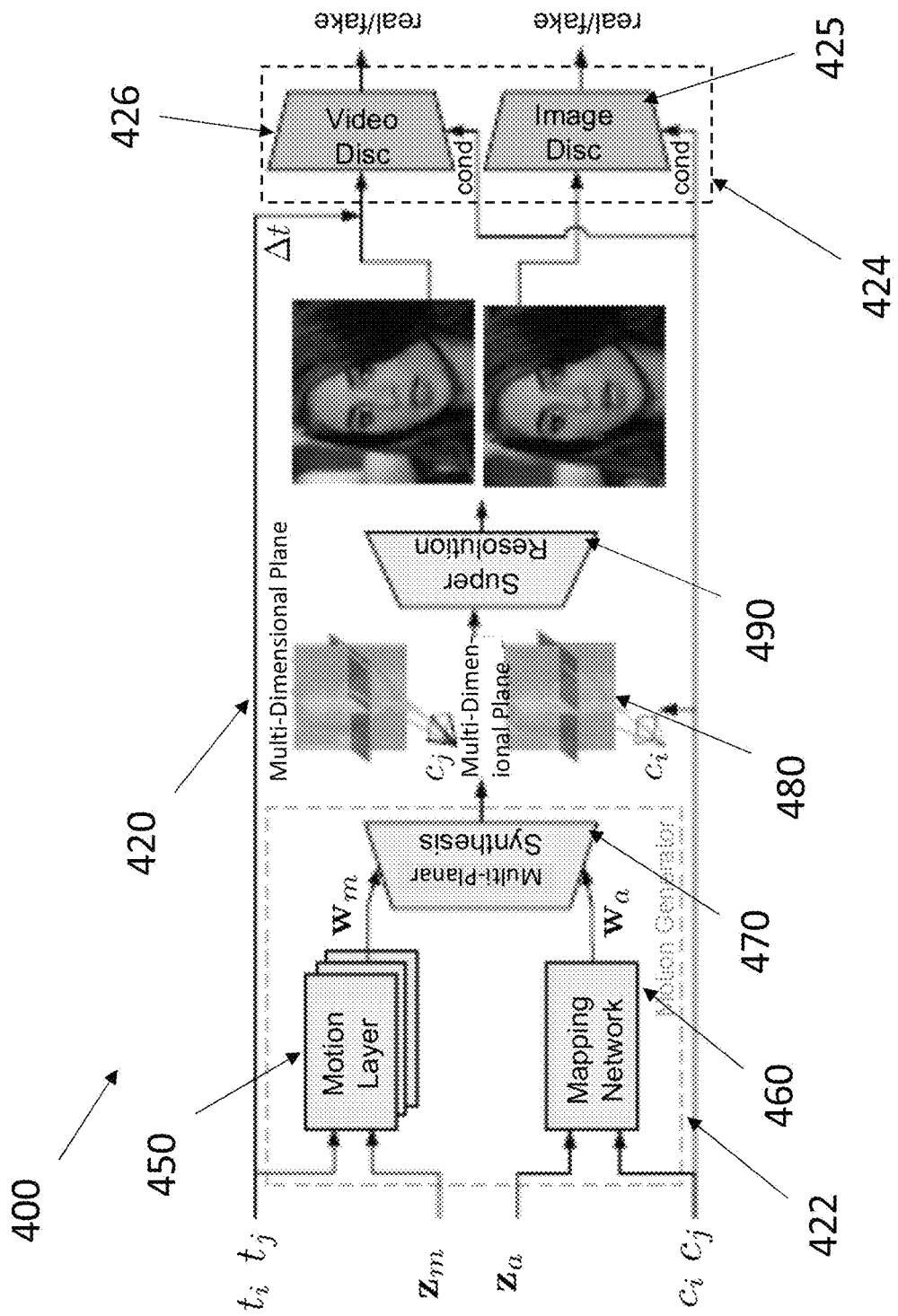
FIG. 4 illustrates an example framework or model, arranged in accordance with at least some embodiments described herein.

FIG. 4 illustrates an example multi-dimensional video generative model or framework 400 for generating a multi-dimensional video, arranged in accordance with at least some embodiments described herein. The multi-dimensional video generative model or framework 400 may have the same or similar components as the multi-dimensional video generative model or framework 100 shown in FIG. 1.

The multi-dimensional video generative model or framework 400 may include a generative model 420 that includes a generator 422, a discriminator 424, a temporal multi-planar network 480, and a super resolution module 490 for generating the multi-dimensional video. The multi-dimensional video generative model or framework 400 may operate in a supervised or an unsupervised or a condition setting. The generator 422, the discriminator 424, the temporal multi-planar network 480, and/or super resolution module 490 may include functions, operations, actions, algorithms, an application, or the like. The generator 422 and/or the discriminator 424 may be conditioned on latent codes, timesteps, and camera poses during training, as discussed below.

In an example embodiment, the generator 422 may be provided and/or receive a training dataset, which may include monocular two-dimensional (2D) video having N video sequences or portrait images with associated camera poses as an input from a source. The source may be an electronic device (e.g., 700 of FIG. 7, etc.) including a smartphone, table computer, a computer, storage, database, a file, cloud storage or network, web-accessible data that may be downloadable, or the like. While the dataset may include monocular 2D video, such disclosure is not intended to be limiting, as other datasets that includes multiple view angles, frames, or the like that may be used to train the multi-dimensional video generative model or framework 400.

The generator 422 may be configured to synthesize image(s) or frames $I \in \mathbb{R}^{H \times W \times 3}$ based on a multi-planar network T from the dataset by using rays from a camera origin o, e.g., based on the given camera pose in the video sequence, along direction d at each pixel. The synthesized images or frames may be two frames within a 16-frame span, or four frames within a 32-frame span, or the like. Sample points $x_r$ along each ray may be queried and interpolated in the multi-planar network T, for example, a Three-Dimensional-Plane or multi-planar network, to get features at each sample point. The features may then be passed to a decoder to predict color c and density $\sigma$ such that:

$$[\sigma(r(s)), c(r(s))] = \text{Decoder}(\text{Interp}(x_r, T))],$$

where Decoder may be a multi-layer perceptron (MLP) with softplus activation, and Interp denotes interpolation. The pixel value may then be calculated by volume rendering as:

$$I(r) = \int_{s_n}^{s_f} p(s) \sigma(r(s)) c(r(s)) ds, \text{ where } p(t) = \exp(\int_{s_n}^{s} \sigma(r(s)) ds)$$

In an example embodiment, during training, the generator 422 may be configured to randomly sample two timesteps $\{t_i, t_j\}$ and their corresponding camera poses $\{c_i, c_j\}$ for one video. The generator 422 may then be configured to develop the motion layers 450 to encode motion code $z_m$ and timesteps $\{t_i, t_j\}$ into the intermediate motion code $w_m$. The generator 422 may also be configured to develop the mapping network 460 to project or encode the appearance code $z_a$ and camera pose c into the intermediate appearance code $w_a$ for content synthesis.

The generator 422 may be further configured to generate temporal and multi-dimensional features, e.g., spatio-temporal features, based on the intermediate appearance code $w_a$ and the intermediate motion code $w_m$ in the synthesis network 470. In an embodiment, the synthesis network 470 may be trained, modeled, and/or encoded based on the intermediate appearance code $w_a$ and the intermediate motion code $w_m$ for each synthesized frame or layer.

With the generated multi-dimensional features at $\{t_i, t_j\}$, the generator 422 may be configured to synthesize frames with camera pose $c_i$ and $c_j$ using the multi-planar network 480, for example, by volume rendering, in which, since the intermediate motion code $w_m$ is being used, a temporal component may be added to the spatio representation in the multi-planar network, e.g., in the multi-dimensional plane. The generator 422 may also be configured to upsample the rendered frames and refine the same with a super-resolution module 490, e.g., to upscale the image without losing content or defining characteristics. The generated video may have a resolution of 512×512. During the training, a resolution of 64 and sampling step of 48 may be used for neural rendering.

In an embodiment, the discriminator 424 may include an image discriminator 425 ($\mathcal{D}_{img}$) and a video discriminator 426 ($\mathcal{D}_{vid}$) to supervise the training of the generator 422. The image discriminator 425 ($\mathcal{D}_{img}$) may be configured to use camera poses as conditions to guide the generator 422 to learn correct multi-dimensional priors to produce multi-view consistent videos or portraits. The camera poses may have 25 dimensions with 16 for extrinsic and 9 for intrinsic. That is, the generative model 420 may be configured to input the generated images and original images from the dataset into the image discriminator 425 ($\mathcal{D}_{img}$). The generative model 420 may be configured to apply $\mathcal{D}_{img}$ on each generated frame $I_i$ (at timestep $t_i$) independently, which may be formulated as:

$p_{img} = \mathcal{D}_{img}(I_i, c_i)$, where $p_{img}$ denotes the real/fake probability.

In an embodiment, the video discriminator 426 ($\mathcal{D}_{vid}$) may be trained by having the generator 422 generate two images $\{I_i, I_j\}$ jointly at two random timesteps $\{t_i, t_j\}$ for each video during training to camera-condition the video discriminator 426 ($\mathcal{D}_{vid}$) as a dual-frame video discriminator to facilitate motion-plausible video generation. In an embodiment, the generative model 420 may be configured to concatenate the generated two images $\{I_i, I_j\}$ channel-wisely to form an image pair. The generative model 420 may be further configured to concatenate a timestep difference $\Delta t = t_j - t_i$ with the image pair to help encode temporal information. The generative model 420 may then be configured to input the generated images and/or videos and original images and/or videos from the dataset into the video discriminator 426 ($\mathcal{D}_{vid}$). As such, the video discriminator 426 ($\mathcal{D}_{vid}$) is configured to learn to differentiate the real and generated image pairs based on motion features extracted from this hybrid input. Moreover, the video discriminator 426 ($\mathcal{D}_{vid}$) may be further configured to be conditioned on the corresponding camera poses $\{c_i, c_j\}$ to alleviate motion ambiguity and model view-dependent effects.

In an embodiment, the video discriminator 426 ($\mathcal{D}_{vid}$) may be formulated as:

$p_{vid} = \mathcal{D}_{vid}([I_i, I_j, \Delta t], [c_i, c_j])$, where $p_{vid}$ indicates the probability of each image pair being sampled from real data distribution. It is appreciated that while the video discriminator 426 ($\mathcal{D}_{vid}$) may only take two frames as inputs from 16 frames, 32 frames, 96 frames, or the like from the generated video, video discriminator 426 ($\mathcal{D}_{vid}$) may be able to effectively learn temporal information and help produce motion plausible results, e.g., authenticity of the video/ images. It was also surprisingly found that by taking the two frames as inputs, the training efficiency and stability may be improved over prior designs or frameworks that take long sequences as conditions.

In an example embodiment, the image discriminator and the video discriminator may be configured to determine the plausible movements based on the dataset, e.g., head movements, mouth movements, etc.

It is appreciated that while two timesteps are discussed above, the generator 422 may sample two or more timesteps, e.g., 4, 6, 10, etc. timesteps, and their corresponding camera poses for refining the model, which may depend on the processing time required for such training.

In an embodiment, the generator 422 may be further trained to compute the generator loss to overcome saturation of the image or frame, for example, by maximizing the log of the discriminator probabilities for the generated images, e.g., non-saturating GAN loss. In an embodiment, the non-saturating GAN loss may be computed for the image discriminator and the video discriminator as $\mathcal{L}_{img}$ and $\mathcal{L}_{vid}$ and a R1 regularization loss $\mathcal{L}_{R1}$, e.g., error made by the model or framework, may also be computed. The generator 422 may be configured to also compute density regularization Lo on the generated video frames. The overall loss may be formulated as follows:

$$\mathcal{L}_{adv}\mathcal{G} = \mathcal{L}_{img}\mathcal{G} + \mathcal{L}_{vid}\mathcal{G} + \mathcal{L}o, \mathcal{L}_{adv}\mathcal{D} = \mathcal{L}_{img}\mathcal{D} + \mathcal{L}_{vid}\mathcal{D} + \mathcal{L}_{R1}$$

Once the multi-dimensionally-aware generative model is trained, it may be deployed and used to generate multi-dimensional video, e.g., three-dimensional video.

Figure 5:
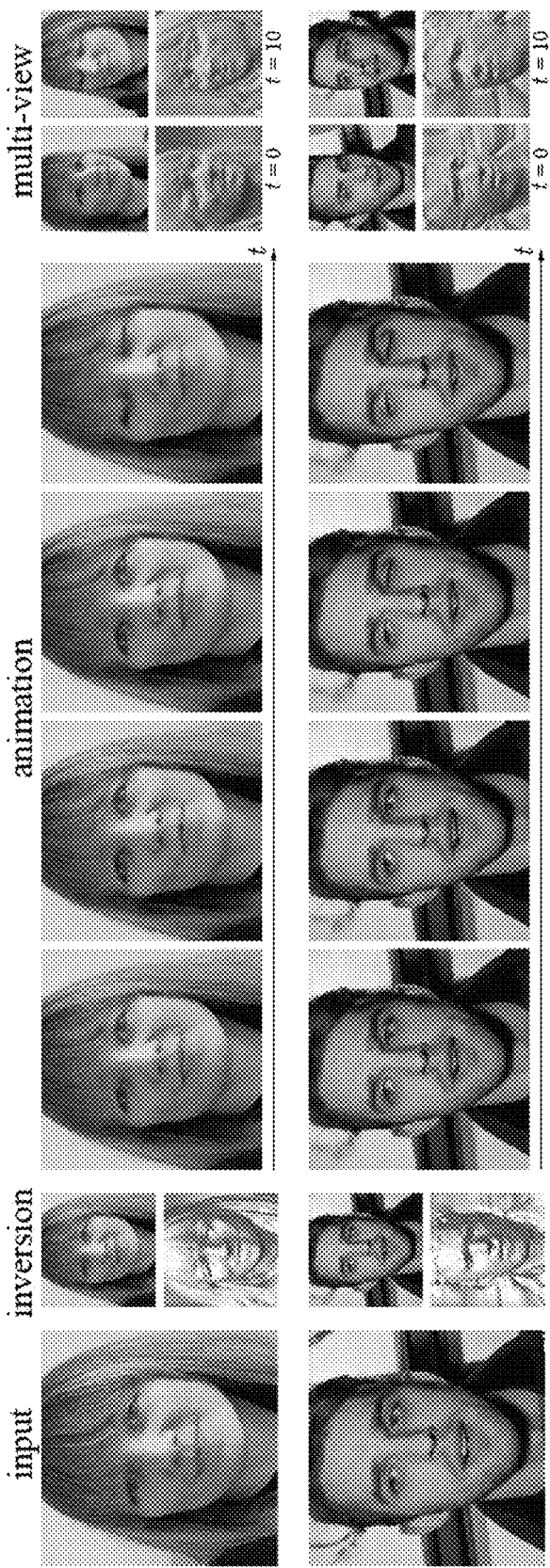
FIG. 5 illustrates example representations of portrait videos resulting from generating multi-dimensional video from multi-dimensionally aware spatio-temporal representations, arranged in accordance with at least some embodiments described herein.

FIG. 5 illustrates representations of portrait videos generated by a multi-dimensional video generative model or framework, in accordance with an example embodiment. The method for the static image portrait animation, e.g., videos, may include providing a static portrait to a multi-dimensionally aware generator of the multi-dimensional video generative model and generating animation of the static portrait by a multi-dimensionally aware generator. The generating may include inverting the static portrait into a latent space of the multi-dimensionally aware generator and synthesizing content of the multi-dimensional video using an appearance component of the multi-dimensionally aware generator and corresponding camera pose and formulating an intermediate appearance code. The synthesizing may include initially fixing the multi-dimensionally aware generator to optimize the appearance component at an initial timestep of 0. The method may further include developing a synthesis layer for encoding a motion component of the multi-dimensionally aware generator at a plurality of timesteps and formulating an intermediate motion code, in which the developing the synthesis layer may include fixing the appearance component and randomly sampling the motion component. The method may also include introducing temporal dynamics into the intermediate appearance code and the intermediate motion code and generating multi-dimensionally aware spatio-temporal representations of the static portrait.

The method for static image portrait animation may include any of the above steps in any of the other embodiments, including, but not limited to: using a discriminator module comprising an image discriminator for evaluating video appearance quality and a video discriminator for ensuring video motion plausibility; the image discriminator being conditioned on camera poses to guide the generating of each frame in the multi-dimensional video from multi-dimensional priors to produce multi-view consistent portraits; in which introducing the temporal dynamics includes modulating static appearance features via adaptive instance normalization to incorporate the temporal dynamics to compute motion features at each timestep in the multi-dimensional video; fusing the motion component with the intermediate appearance component and passing the fused components to a next synthesis layer iteratively to generate multi-dimensional frames at each timestep; volume rendering the generated multi-dimensionally aware spatio-temporal representation to generate synthesized frames of the multi-dimensional video with the corresponding camera poses; and upsampling the volume rendered generated multi-dimensionally aware spatio-temporal representation and refining the volume rendered generated multi-dimensionally aware spatio-temporal representation using a super resolution module.

As such, the multi-dimensional video generative model or framework may be able to generate a video frame at a certain timestep instead of generating from the first frame autoregressively. This flexible architecture may enable the static portrait animation. That is, given the input image and the estimated camera pose, the generator may be fixed and latent code(s) optimized at timestep t=0. The inversion is performed in a latent vector space, for example, a W+ space, e.g., having size of 18×512. As shown in FIG. 5, the inversion based on the multi-dimensionally-aware generative model may produce high-quality multi-dimensional shape for the input frame. The latent code may then be fixed and a motion code may be randomly sampled to drive the portrait with natural motion. With the multi-dimensional priors, e.g., three-dimensional priors, learned by the multi-dimensionally-aware generator and multi-dimensional video generative model or framework, the synthesized videos may also be rendered with arbitrary viewpoints, e.g., animate the static portrait with natural motion and synthesize portrait videos with multi-view consistency.

Figure 6:
FIG. 6 illustrates other example representations of reconstructed videos resulting from generating multi-dimensional video from multi-dimensionally aware spatio-temporal representations, arranged in accordance with at least some embodiments described herein.

FIG. 6 illustrates representations of reconstructed videos and/or edited videos generated by the multi-dimensional video generative model or framework, in accordance with an example embodiment. The method for video reconstruction and/or motion editing, may include providing a monocular video to a multi-dimensionally aware generator of the multi-dimensional video generative model and reconstructing the video and/or editing motion in the monocular video by the multi-dimensionally aware generator. The generating may include inverting the monocular video into a latent space of the multi-dimensionally aware generator and synthesizing content of the multi-dimensional video using an appearance component of the multi-dimensionally aware generator and corresponding camera pose and formulating an intermediate appearance code. The synthesizing may include initially fixing the multi-dimensionally aware generator to optimize the appearance component in the latent space. The method may further include developing a synthesis layer for encoding a motion component of the multi-dimensionally aware generator at a plurality of timesteps and formulating an intermediate motion code, in which the developing the synthesis layer comprises inversing the motion component for each frame in the video individually and sampling a plurality of motion components to provide motion multi-dimensionally. The method may also include introducing temporal dynamics into the intermediate appearance code and the intermediate motion code and generating multi-dimensionally aware spatio-temporal representations of the monocular video.

The method for video reconstruction and/or motion editing may include any of the above steps in any of the other embodiments, including, but not limited to: using a discriminator module comprising an image discriminator for evaluating video appearance quality and a video discriminator for ensuring video motion plausibility; the image discriminator being conditioned on camera poses to guide the generating of each frame in the multi-dimensional video from multi-dimensional priors to produce multi-view consistent portraits; in which introducing the temporal dynamics includes modulating static appearance features via adaptive instance normalization to incorporate the temporal dynamics to compute motion features at each timestep in the multi-dimensional video; fusing the motion component with the intermediate appearance component and passing the fused components to a next synthesis layer iteratively to generate multi-dimensional frames at each timestep; volume rendering the generated multi-dimensionally aware spatio-temporal representation to generate synthesized frames of the multi-dimensional video with the corresponding camera poses; and upsampling the volume rendered generated multi-dimensionally aware spatio-temporal representation and refining the volume rendered generated multi-dimensionally aware spatio-temporal representation using a super resolution module.

As such, given a video and its pre-estimated camera pose sequence, a video may be reconstructed based on the multi-dimensionally-aware generator. In an example embodiment, video content may be generated by optimizing the intermediate appearance code e.g., $w_a^i$ in a latent space, e.g., W+ space. The motion component may be generated by inversing the motion component or code $z_m$ space for each video frame individually. It is appreciated that since the motion component or code and the appearance component or code may be disentangled, the appearance codes may be fixed and the motion codes may be sampled to manipulate the motion of input videos in the multi-dimensional domain, e.g., three-dimensional domain. In an example embodiment, the original motions in the video may be altered or changed. As such, the results may still maintain multi-view consistency even at arbitrary viewpoints.

Figure 7:
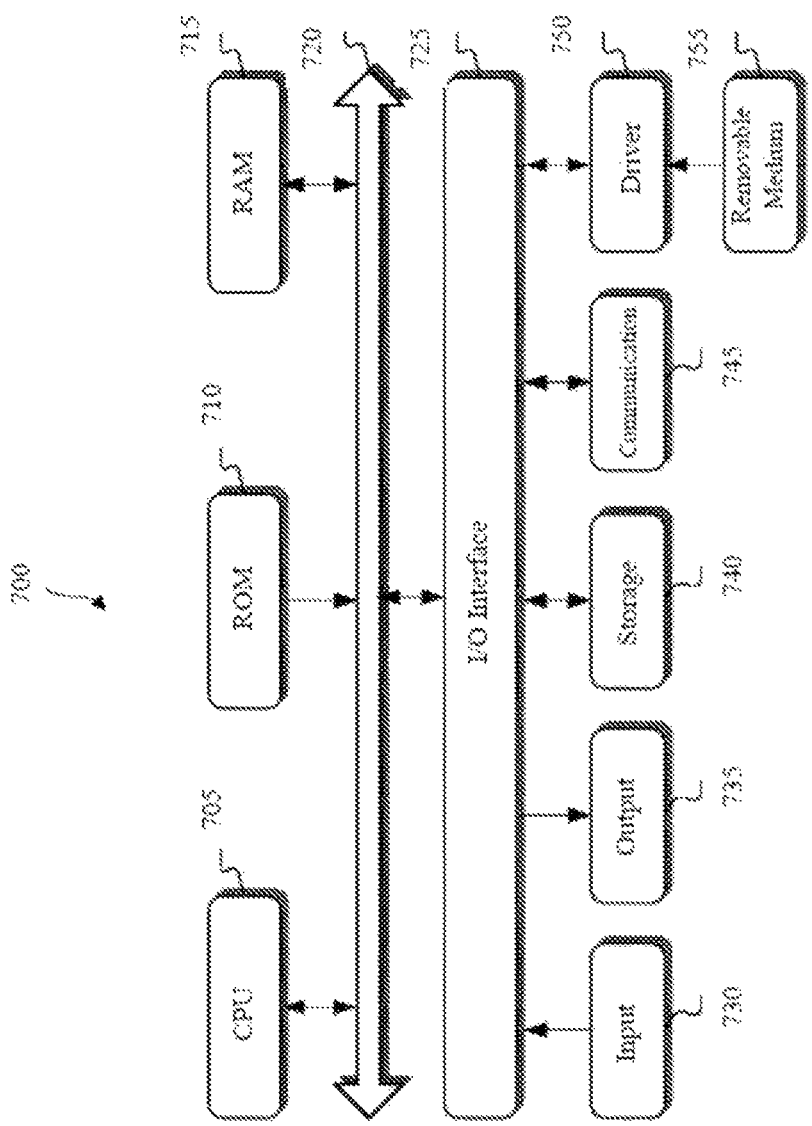
FIG. 7 is a schematic structural diagram of an example computer system applicable to implementing an electronic device, arranged in accordance with at least some embodiments described herein.

FIG. 7 is a schematic structural diagram of an example computer system 700 applicable to implementing an electronic device (for example, a GPU or CPU), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 715 may also store various data and programs required for operations of the system 700. The CPU 705, the ROM 710, and the RAM 715 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

As such, a multi-dimensional video generative model or framework may be provided that may synthesize multi-view consistent videos, e.g., portrait videos, by generating temporal multi-planar representations by modulating appearance components, codes, or features based on motion components, codes, or features, and timestep, e.g., using multi-dimensionally implicit neural representations to model the spatio-temporal space. The multi-dimensional video generative model or framework may include a multi-dimensionally-aware image generator that synthesizes multi-view consistent videos with high-quality multi-dimensional geometry given joint conditions of random noise z, camera viewpoint c, and timestep t without relying on 3D geometry or multi-view supervision. Specifically, the multi-dimensional video generative model or framework is configured to decompose latent codes into appearance and motion components, include a temporal multi-planar network based motion generator, have camera pose sequence conditioned in the models, and use camera-conditioned video discriminators to significantly improve video fidelity, e.g., diverse motions, and dynamic multi-dimensional geometry quality for multi-dimensional video generation, e.g., 3D portrait video generation. Moreover, the multi-dimensional video generative model or framework may be able to be trained on a monocular 2D video collection.

It is to be understood that the disclosed and other solutions, examples, embodiments, modules and the functional operations described in this document may be implemented in digital electronic circuitry, or in computer software, firmware, or hardware, including the structures disclosed in this document and their structural equivalents, or in combinations of one or more of them. The disclosed and other embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this document may be performed by one or more programmable processors executing one or more computer programs to perform functions by operating on input data and generating output. The processes and logic flows may also be performed by, and apparatus may also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; and magneto optical disks. The processor and the memory may be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of the aspects may be combined with each other.

Aspect 1. A method for generating a multi-dimensional video, the method comprising: providing an input data to a multi-dimensionally aware generator of a multi-dimensional video generative model; generating the multi-dimensional video from the input data by the multi-dimensionally aware generator by: inverting the input data into a latent space of the multi-dimensionally aware generator; synthesizing content of the multi-dimensional video using an appearance component of the multi-dimensionally aware generator and corresponding camera pose and formulating an intermediate appearance code; developing a synthesis layer for encoding a motion component of the multi-dimensionally aware generator at a plurality of timesteps and formulating an intermediate motion code; introducing temporal dynamics into the intermediate appearance code and the intermediate motion code; and generating multi-dimensionally aware spatio-temporal representations of the input data.

Aspect 2. The method of Aspect 1, further comprising generating the multi-dimensional video from the multi-dimensionally aware spatio-temporal representations by using a discriminator module comprising an image discriminator for evaluating video appearance quality and a video discriminator for ensuring video motion plausibility.

Aspect 3. The method of any of Aspects 1 or 2, wherein the video discriminator is a camera conditioned dual frame video discriminator by, during training: generating two images by the generator jointly at different timesteps, concatenating the generated two images to form an image pair; concatenating a timestep difference between the two images to the two images; and differentiating real and generated image pairs based on motion features extracted from the generated two images and corresponding camera poses.

Aspect 4. The method of Aspect 2, wherein the image discriminator uses camera poses as conditions to guide the generating of each frame in the multi-dimensional video from multi-dimensional priors to produce multi-view consistent portraits.

Aspect 5. The method of any of Aspects 1-4, wherein the introducing the temporal dynamics includes modulating static appearance features via adaptive instance normalization to incorporate the temporal dynamics to compute motion features at each timestep in the multi-dimensional video.

Aspect 6. The method of any of Aspects 1-5, wherein generating the multi-dimensionally aware spatio-temporal representations further comprises: fusing the motion component with the intermediate appearance component; and passing the fused components to a next synthesis layer iteratively to generate multi-dimensional frames at each timestep.

Aspect 7. The method of any of Aspects 1-6, further comprising: volume rendering the generated multi-dimensionally aware spatio-temporal representation to generate synthesized frames of the multi-dimensional video with the corresponding camera poses.

Aspect 8. The method of Aspect 7, further comprising upsampling the volume rendered generated multi-dimensionally aware spatio-temporal representation and refining the volume rendered generated multi-dimensionally aware spatio-temporal representation using a super resolution module.

Aspect 9. The method of any of Aspects 1-8, wherein the synthesis layer comprises a plurality of motion layers.

Aspect 10. The method of Aspect 9, wherein each of the plurality of motion layers is encoded with the motion component and a timestep to formulate an intermediate motion code at each timestep.

Aspect 11. The method of Aspect 10, wherein the formulation of the intermediate motion code at each timestep includes: multiplying the motion code with the timestep, performing a lightweight mapping head with a rectified linear function activation, and encoding the motion code and the timestep to formulate the intermediate motion code at the timestep using a multi-layer perceptron.

Aspect 12. The method of any of Aspects 1-11, further comprising: training the generator of the multi-dimensional video generative model by: obtaining a dataset comprising monocular two-dimensional video including at least one video sequence into the multi-dimensional video generative model; sampling the at least one video sequence at two timesteps and corresponding camera poses; synthesizing the sample video sequence by projecting the appearance code and the camera poses into the intermediate appearance code; encoding the motion component and the two timesteps using a motion layer into the intermediate motion code; generating spatio-temporal features at the two timesteps from the intermediate appearance code and the intermediate motion code; volume rendering synthesized frames with the corresponding camera poses; discriminating an image and a video of the synthesized frames using an image discriminator and a video discriminator to supervise the learning of the multi-dimensional video generative model, wherein the image discriminator and the video discriminator are camera conditioned.

Aspect 13. The method of Aspect 12, further comprising upsampling the volume rendered synthesized frames and refining the volume rendered synthesized frames using a super resolution module.

Aspect 14. The method of any of Aspects 1-13, wherein the method is for static portrait animation, wherein: the input data is a static portrait image, the multi-dimensional video is an animation of the static portrait image, the synthesizing comprises initially fixing the multi-dimensionally aware generator to optimize the appearance component at an initial timestep of 0, and developing the synthesis layer comprises fixing the appearance component and randomly sampling the motion component.

Aspect 15. The method of any of Aspects 1-14, wherein the method is for video reconstruction and/or motion editing, wherein: the input data is a monocular video, the multi-dimensional video is for at least one of monocular video reconstruction or motion editing, the synthesizing comprises initially fixing the multi-dimensionally aware generator to optimize the appearance component in the latent space, and developing the synthesis layer comprises inversing the motion component for each frame in the monocular video individually and sampling a plurality of motion components to provide motion multi-dimensionally.

Aspect 16. A non-transitory computer-readable medium having computer-executable instructions stored thereon that, upon execution, cause one or more processors to perform operations comprising: providing an input data to a multi-dimensionally aware generator of a multi-dimensional video generative model; generating the multi-dimensional video from the input data by the multi-dimensionally aware generator by: inverting the input data into a latent space of the multi-dimensionally aware generator; synthesizing content of the multi-dimensional video using an appearance component of the multi-dimensionally aware generator and corresponding camera pose and formulating an intermediate appearance code; developing a synthesis layer for encoding a motion component of the multi-dimensionally aware generator at a plurality of timesteps and formulating an intermediate motion code; introducing temporal dynamics into the intermediate appearance code and the intermediate motion code; and generating multi-dimensionally aware spatio-temporal representations of the input data.

Aspect 17. The non-transitory computer-readable medium of Aspect 16, wherein the operations are for static portrait animation, wherein: the input data is a static portrait image, the multi-dimensional video is an animation of the static portrait image, the synthesizing comprises initially fixing the multi-dimensionally aware generator to optimize the appearance component at an initial timestep of 0, and developing the synthesis layer comprises fixing the appearance component and randomly sampling the motion component.

Aspect 18. The non-transitory computer-readable medium of Aspect 16, wherein the operations are for video reconstruction and/or motion editing, wherein: the input data is a monocular video, the multi-dimensional video is for at least one of monocular video reconstruction or motion editing, the synthesizing comprises initially fixing the multi-dimensionally aware generator to optimize the appearance component in the latent space, and developing the synthesis layer comprises inversing the motion component for each frame in the monocular video individually and sampling a plurality of motion components to provide motion multi-dimensionally.

Aspect 19. A generator of a multi-dimensional video generative model for generating multi-dimensional video, the generator comprising: a control logic module to obtain an input of an input data; a model to generate the multi-dimensional video from the input data by: inverting the input data into a latent space of the multi-dimensionally aware generator; synthesizing content of the multi-dimensional video using an appearance component of the multi-dimensionally aware generator and corresponding camera pose and formulating an intermediate appearance code; developing a synthesis layer for encoding a motion component of the multi-dimensionally aware generator at a plurality of timesteps and formulating an intermediate motion code; introducing temporal dynamics into the intermediate appearance code and the intermediate motion code; and generating multi-dimensionally aware spatio-temporal representations of the input data.

Aspect 20. The generator according to Aspect 19, wherein: the input data is a static portrait image, the multi-dimensional video is an animation of the static portrait image, the synthesizing comprises initially fixing the multi-dimensionally aware generator to optimize the appearance component at an initial timestep of 0, and developing the synthesis layer comprises fixing the appearance component and randomly sampling the motion component.

Aspect 21. A method for static portrait animation, the method comprising: providing a static portrait to a multi-dimensionally aware generator of a multi-dimensional video generative model; generating animation of the static portrait by the multi-dimensionally aware generator by: inverting the static portrait into a latent space of the multi-dimensionally aware generator; synthesizing content of the multi-dimensional video using an appearance component of the multi-dimensionally aware generator and corresponding camera pose and formulating an intermediate appearance code, wherein the synthesizing comprises initially fixing the multi-dimensionally aware generator to optimize the appearance component at an initial timestep of 0; developing a synthesis layer for encoding a motion component of the multi-dimensionally aware generator at a plurality of timesteps and formulating an intermediate motion code, wherein developing the synthesis layer comprises fixing the appearance component and randomly sampling the motion component; introducing temporal dynamics into the intermediate appearance code and the intermediate motion code; generating multi-dimensionally aware spatio-temporal representations of the static portrait.

Aspect 22. A non-transitory computer-readable medium having computer-executable instructions stored thereon that, upon execution, cause one or more processors to perform operations comprising: providing a static portrait to a multi-dimensionally aware generator of a multi-dimensional video generative model; generating animation of the static portrait by the multi-dimensionally aware generator by: inverting the static portrait into a latent space of the multi-dimensionally aware generator; synthesizing content of the multi-dimensional video using an appearance component of the multi-dimensionally aware generator and corresponding camera pose and formulating an intermediate appearance code, wherein the synthesizing comprises initially fixing the multi-dimensionally aware generator to optimize the appearance component at an initial timestep of 0; developing a synthesis layer for encoding a motion component of the multi-dimensionally aware generator at a plurality of timesteps and formulating an intermediate motion code, wherein developing the synthesis layer comprises fixing the appearance component and randomly sampling the motion component; introducing temporal dynamics into the intermediate appearance code and the intermediate motion code; and generating multi-dimensionally aware spatio-temporal representations of the static portrait.

Aspect 23. A method for video reconstruction and/or motion editing, the method comprising: providing a monocular video to a multi-dimensionally aware generator of a multi-dimensional video generative model; reconstructing the video and/or editing motion in the monocular video by the multi-dimensionally aware generator by: inverting the monocular video into a latent space of the multi-dimensionally aware generator; synthesizing content of the multi-dimensional video using an appearance component of the multi-dimensionally aware generator and corresponding camera pose and formulating an intermediate appearance code, wherein the synthesizing comprises initially fixing the multi-dimensionally aware generator to optimize the appearance component in the latent space; developing a synthesis layer for encoding a motion component of the multi-dimensionally aware generator at a plurality of timesteps and formulating an intermediate motion code, wherein developing the synthesis layer comprises inversing the motion component for each frame in the video individually and sampling a plurality of motion components to provide motion multi-dimensionally; introducing temporal dynamics into the intermediate appearance code and the intermediate motion code; generating multi-dimensionally aware spatio-temporal representations of the monocular video.

Aspect 24. A non-transitory computer-readable medium having computer-executable instructions stored thereon that, upon execution, cause one or more processors to perform operations comprising: providing a monocular video to a multi-dimensionally aware generator of a multi-dimensional video generative model; reconstructing the video and/or editing motion in the monocular video by the multi-dimensionally aware generator by: inverting the monocular video into a latent space of the multi-dimensionally aware generator; synthesizing content of the multi-dimensional video using an appearance component of the multi-dimensionally aware generator and corresponding camera pose and formulating an intermediate appearance code, wherein the synthesizing comprises initially fixing the multi-dimensionally aware generator to optimize the appearance component in the latent space; developing a synthesis layer for encoding a motion component of the multi-dimensionally aware generator at a plurality of timesteps and formulating an intermediate motion code, wherein developing the synthesis layer comprises inversing the motion component for each frame in the video individually and sampling a plurality of motion components to provide motion multi-dimensionally; introducing temporal dynamics into the intermediate appearance code and the intermediate motion code; and generating multi-dimensionally aware spatio-temporal representations of the monocular video.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for generating a multi-dimensional video, the method comprising:
   providing an input data to a multi-dimensionally aware generator of a multi-dimensional video generative model;
   generating the multi-dimensional video from the input data by the multi-dimensionally aware generator by:
      inverting the input data into a latent space of the multi-dimensionally aware generator;
      synthesizing content of the multi-dimensional video using an appearance component of the multi-dimensionally aware generator and corresponding camera pose and formulating an intermediate appearance code;
      developing a synthesis layer for encoding a motion component of the multi-dimensionally aware generator at a plurality of timesteps and formulating an intermediate motion code;
      introducing temporal dynamics into the intermediate appearance code and the intermediate motion code; and
      generating multi-dimensionally aware spatio-temporal representations of the input data.

2. The method of claim 1, further comprising generating the multi-dimensional video from the multi-dimensionally aware spatio-temporal representations by using a discriminator module comprising an image discriminator for evaluating video appearance quality and a video discriminator for ensuring video motion plausibility.

3. The method of claim 1, wherein the video discriminator is a camera conditioned dual frame video discriminator by, during training:
   generating two images by the generator jointly at different timesteps,
   concatenating the generated two images to form an image pair;
   concatenating a timestep difference between the two images to the two images; and
   differentiating real and generated image pairs based on motion features extracted from the generated two images and corresponding camera poses.

4. The method of claim 2, wherein the image discriminator uses camera poses as conditions to guide the generating of each frame in the multi-dimensional video from multi-dimensional priors to produce multi-view consistent portraits.

5. The method of claim 1, wherein the introducing the temporal dynamics includes modulating static appearance features via adaptive instance normalization to incorporate the temporal dynamics to compute motion features at each timestep in the multi-dimensional video.

6. The method of claim 1, wherein generating the multi-dimensionally aware spatio-temporal representations further comprises:
   fusing the motion component with the intermediate appearance component; and
   passing the fused components to a next synthesis layer iteratively to generate multi-dimensional frames at each timestep.

7. The method of claim 1, further comprising:
   volume rendering the generated multi-dimensionally aware spatio-temporal representation to generate synthesized frames of the multi-dimensional video with the corresponding camera poses.

8. The method of claim 7, further comprising upsampling the volume rendered generated multi-dimensionally aware spatio-temporal representation and refining the volume rendered generated multi-dimensionally aware spatio-temporal representation using a super resolution module.

9. The method of claim 1, wherein the synthesis layer comprises a plurality of motion layers.

10. The method of claim 9, wherein each of the plurality of motion layers is encoded with the motion component and a timestep to formulate an intermediate motion code at each timestep.

11. The method of claim 10, wherein the formulation of the intermediate motion code at each timestep includes:
   multiplying the motion code with the timestep,
   performing a lightweight mapping with a rectified linear function activation, and
   encoding the motion code and the timestep to formulate the intermediate motion code at the timestep using a multi-layer perceptron.

12. The method of claim 1, further comprising:
   training the generator of the multi-dimensional video generative model by:
      obtaining a dataset comprising monocular two-dimensional video including at least one video sequence into the multi-dimensional video generative model;
      sampling the at least one video sequence at two timesteps and corresponding camera poses;
      synthesizing the sample video sequence by projecting the appearance code and the camera poses into the intermediate appearance code;
      encoding the motion component and the two timesteps using a motion layer into the intermediate motion code;
      generating spatio-temporal features at the two timesteps from the intermediate appearance code and the intermediate motion code;
      volume rendering synthesized frames with the corresponding camera poses;
      discriminating an image and a video of the synthesized frames using an image discriminator and a video discriminator to supervise the learning of the multi-dimensional video generative model,
      wherein the image discriminator and the video discriminator are camera conditioned.

13. The method of claim 12, further comprising upsampling the volume rendered synthesized frames and refining the volume rendered synthesized frames using a super resolution module.

14. The method of claim 1, wherein the method is for static portrait animation, wherein:
   the input data is a static portrait image,
   the multi-dimensional video is an animation of the static portrait image,
   the synthesizing comprises initially fixing the multi-dimensionally aware generator to optimize the appearance component at an initial timestep of 0, and
   developing the synthesis layer comprises fixing the appearance component and randomly sampling the motion component.

15. The method of claim 1, wherein the method is for video reconstruction and/or motion editing, wherein:
the input data is a monocular video,
the multi-dimensional video is for at least one of monocular video reconstruction or motion editing,
the synthesizing comprises initially fixing the multi-dimensionally aware generator to optimize the appearance component in the latent space, and
developing the synthesis layer comprises inversing the motion component for each frame in the monocular video individually and sampling a plurality of motion components to provide motion multi-dimensionally.

16. A non-transitory computer-readable medium having computer-executable instructions stored thereon that, upon execution, cause one or more processors to perform operations comprising:
providing an input data to a multi-dimensionally aware generator of a multi-dimensional video generative model;
generating the multi-dimensional video from the input data by the multi-dimensionally aware generator by:
inverting the input data into a latent space of the multi-dimensionally aware generator;
synthesizing content of the multi-dimensional video using an appearance component of the multi-dimensionally aware generator and corresponding camera pose and formulating an intermediate appearance code;
developing a synthesis layer for encoding a motion component of the multi-dimensionally aware generator at a plurality of timesteps and formulating an intermediate motion code;
introducing temporal dynamics into the intermediate appearance code and the intermediate motion code; and
generating multi-dimensionally aware spatio-temporal representations of the input data.

17. The non-transitory computer-readable medium of claim 16, wherein the operations are for static portrait animation, wherein:
the input data is a static portrait image,
the multi-dimensional video is an animation of the static portrait image,
the synthesizing comprises initially fixing the multi-dimensionally aware generator to optimize the appearance component at an initial timestep of 0, and
developing the synthesis layer comprises fixing the appearance component and randomly sampling the motion component.

18. The non-transitory computer-readable medium of claim 16, wherein the operations are for video reconstruction and/or motion editing, wherein:
the input data is a monocular video,
the multi-dimensional video is for at least one of monocular video reconstruction or motion editing,
the synthesizing comprises initially fixing the multi-dimensionally aware generator to optimize the appearance component in the latent space, and
developing the synthesis layer comprises inversing the motion component for each frame in the monocular video individually and sampling a plurality of motion components to provide motion multi-dimensionally.

19. A generator of a multi-dimensional video generative model for generating multi-dimensional video, the generator comprising:
a control logic module to obtain an input of an input data;
a model to generate the multi-dimensional video from the input data by:
inverting the input data into a latent space of the multi-dimensionally aware generator;
synthesizing content of the multi-dimensional video using an appearance component of the multi-dimensionally aware generator and corresponding camera pose and formulating an intermediate appearance code;
developing a synthesis layer for encoding a motion component of the multi-dimensionally aware generator at a plurality of timesteps and formulating an intermediate motion code;
introducing temporal dynamics into the intermediate appearance code and the intermediate motion code; and
generating multi-dimensionally aware spatio-temporal representations of the input data.

20. The generator according to claim 19, wherein:
the input data is a static portrait image,
the multi-dimensional video is an animation of the static portrait image,
the synthesizing comprises initially fixing the multi-dimensionally aware generator to optimize the appearance component at an initial timestep of 0, and
developing the synthesis layer comprises fixing the appearance component and randomly sampling the motion component.

* * * * *